US012574245B2

(12) United States Patent
Jeong et al.

(10) Patent No.: US 12,574,245 B2
(45) Date of Patent: Mar. 10, 2026

(54) HEALTHCARE DATA MANAGEMENT METHOD AND APPARATUS USING HASH VALUES ON CLOUD SERVER

(71) Applicant: RESEARCH & BUSINESS FOUNDATION SUNGKYUNKWAN UNIVERSITY, Suwon-si (KR)

(72) Inventors: Jaehoon Jeong, Busan (KR); Jinyong Kim, Suwon-si (KR); JeongHyeon Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 407 days.

(21) Appl. No.: 18/071,491

(22) Filed: Nov. 29, 2022

(65) Prior Publication Data

US 2023/0171108 A1     Jun. 1, 2023

(30) Foreign Application Priority Data

Nov. 29, 2021     (KR) ........................ 10-2021-0166759

(51) Int. Cl.
*H04L 9/32* (2006.01)
*G06F 21/62* (2013.01)
(52) U.S. Cl.
CPC ........ *H04L 9/3236* (2013.01); *G06F 21/6254* (2013.01)
(58) Field of Classification Search
CPC ........................... H04L 9/3236; G06F 21/6254
USPC ........................................................ 713/193
See application file for complete search history.

(56) References Cited

U.S. PATENT DOCUMENTS

| | | | | |
|---|---|---|---|---|
| 2010/0030690 A1* | 2/2010 | Herlitz | ................. | H04L 9/3226 |
| | | | | 705/50 |
| 2015/0149208 A1* | 5/2015 | Lynch | .................... | G16H 10/60 |
| | | | | 705/3 |
| 2021/0279365 A1* | 9/2021 | Apsingekar | ......... | G06F 21/6254 |
| 2021/0344497 A1* | 11/2021 | Wright | ................. | H04L 9/0643 |
| 2022/0165369 A1* | 5/2022 | Kim | ....................... | G16H 10/20 |

FOREIGN PATENT DOCUMENTS

| KR | 10-2020-0118985 A | 10/2020 |
|---|---|---|
| KR | 10-2020-0121583 A | 10/2020 |
| KR | 10-2021-0077360 A | 6/2021 |

OTHER PUBLICATIONS

Korean Office Action issued on Aug. 28, 2023, in counterpart Korean Patent Application No. 10-2021-0166759 (6 pages in Korean).

* cited by examiner

*Primary Examiner* — Hee Soo Kim
(74) *Attorney, Agent, or Firm* — NSIP Law

(57) ABSTRACT

Provided are a healthcare data management apparatus and method, and a healthcare data management method, that relate to receiving healthcare data including personal information and healthcare information, storing the personal information and the healthcare information, generating a first personal information hash value corresponding to the personal information, generating a first key hash value corresponding to the personal information hash value, generating a first healthcare hash value on the basis of the first personal information hash value and the first key hash value, and confirming whether the first healthcare hash value is a pre-stored value.

12 Claims, 10 Drawing Sheets

【FIG. 1】
<u>1</u>
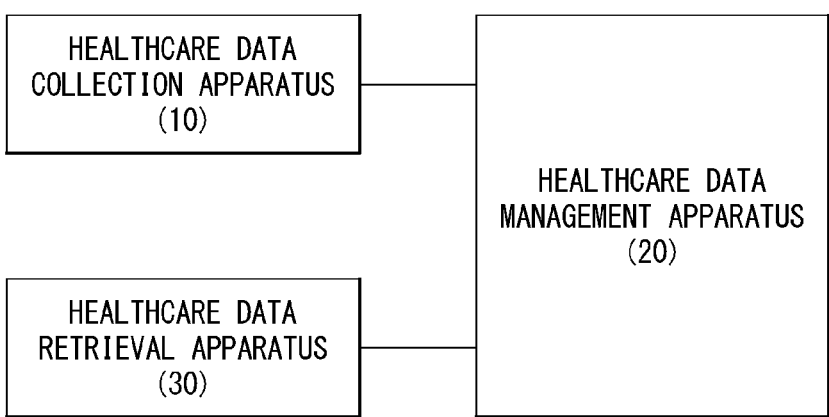

[FIG. 2]
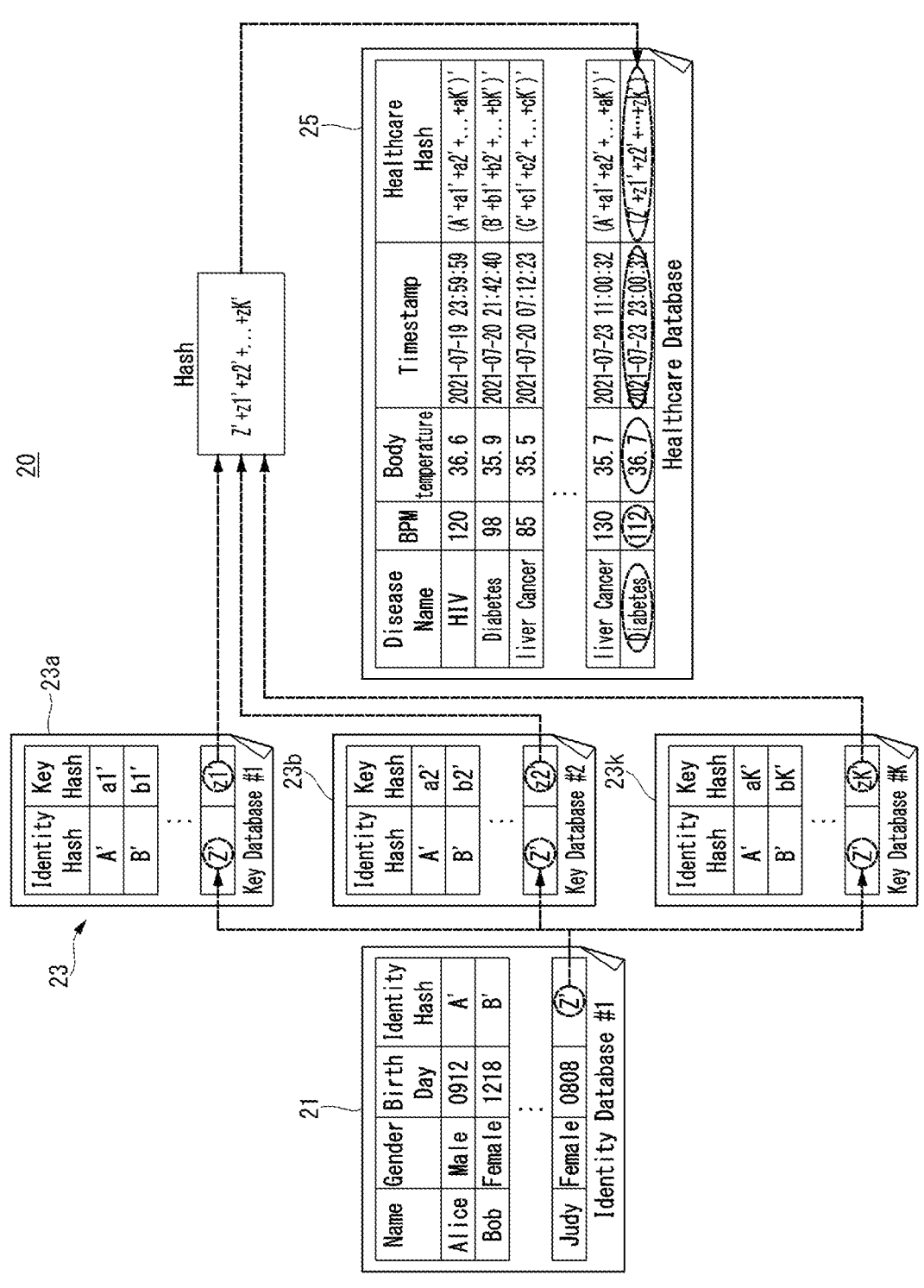

【FIG. 3】
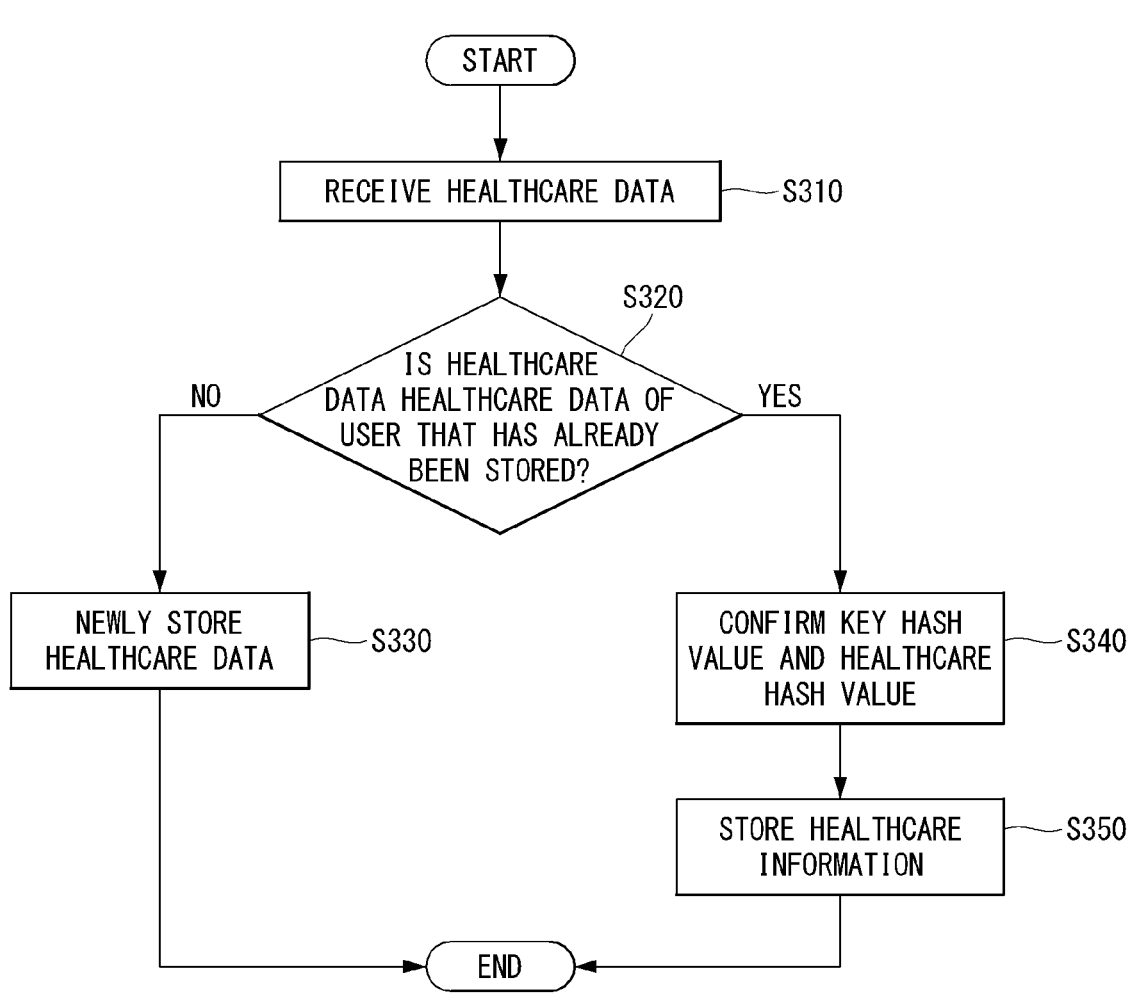

【FIG. 4】
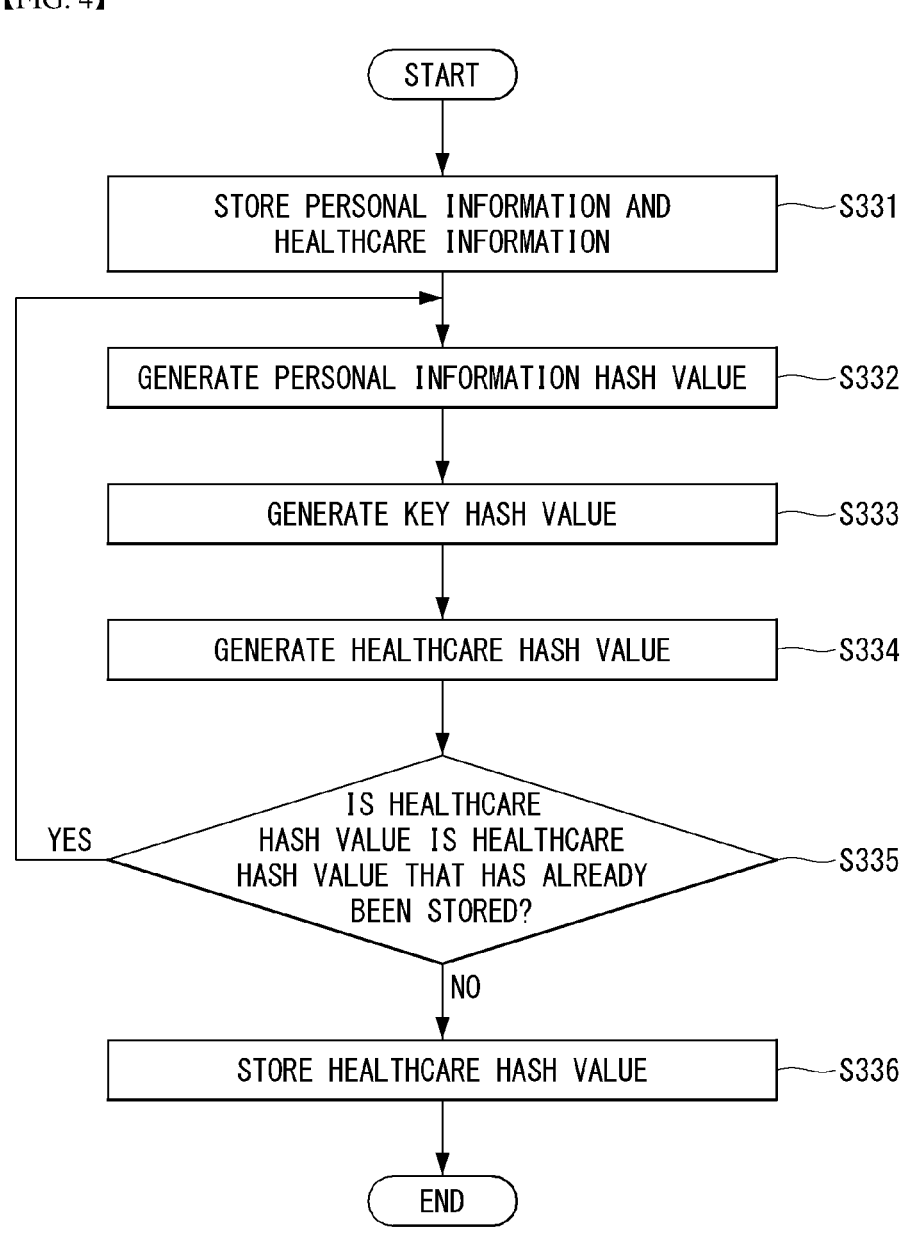

【FIG. 5】
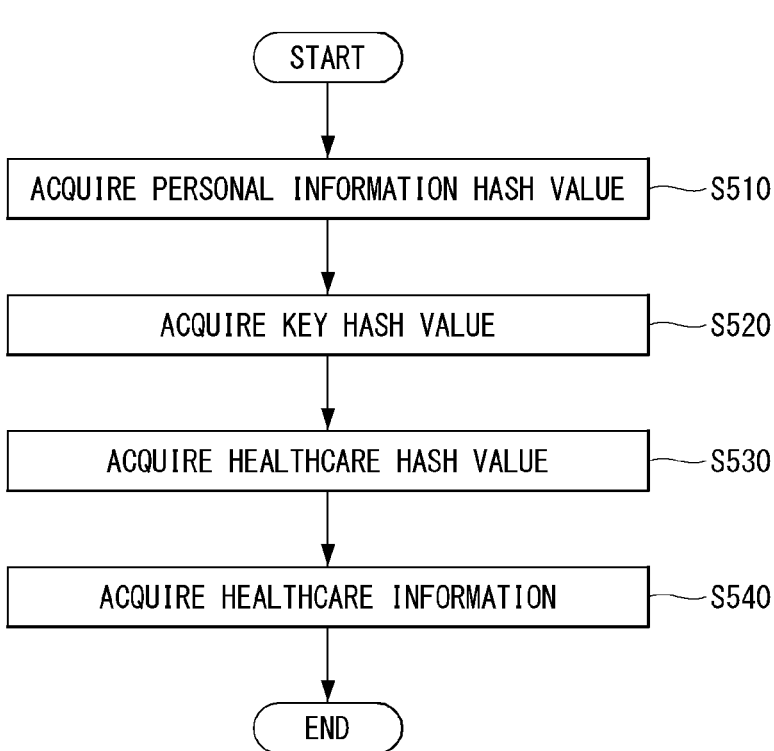

【FIG. 6】
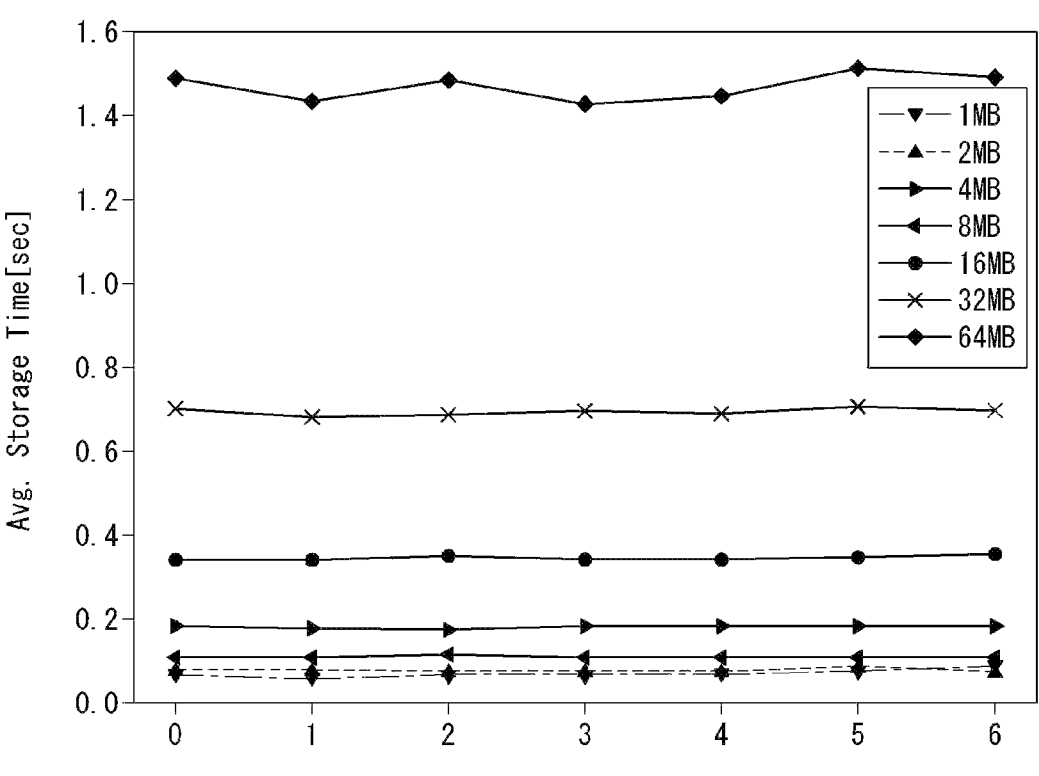
(a) Storage time vs. Number of key databases

【FIG. 7】
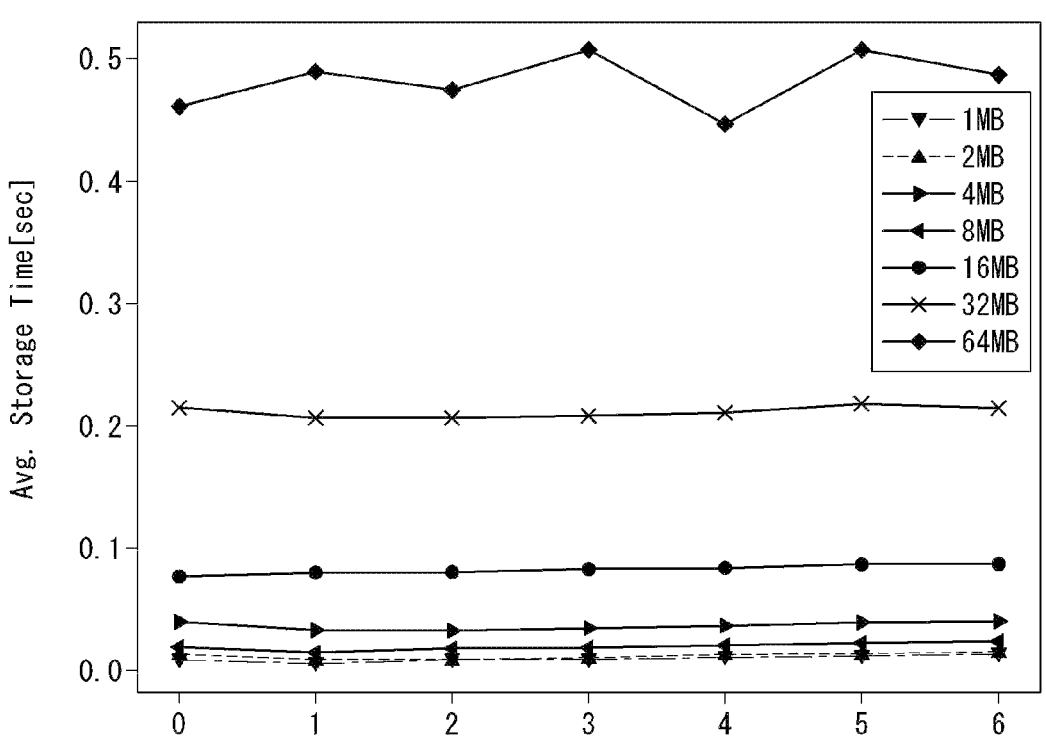
(b) Retrieval time vs. Number of key databases

【FIG. 8】
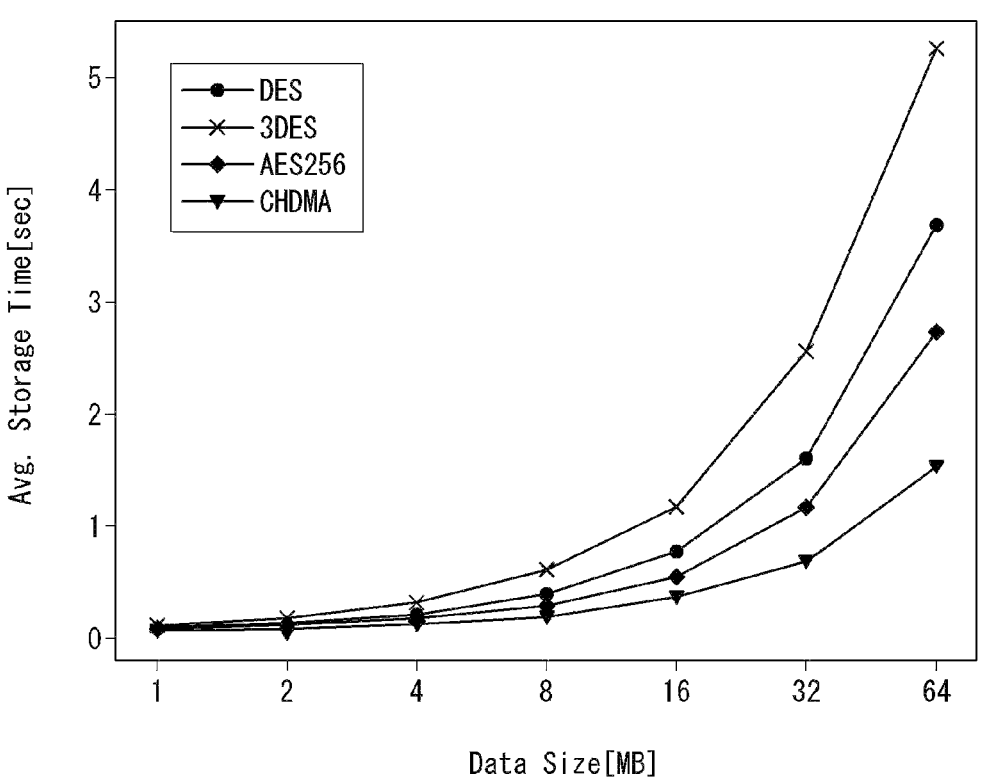
(a) Data storage time vs. Data size.

【FIG. 9】
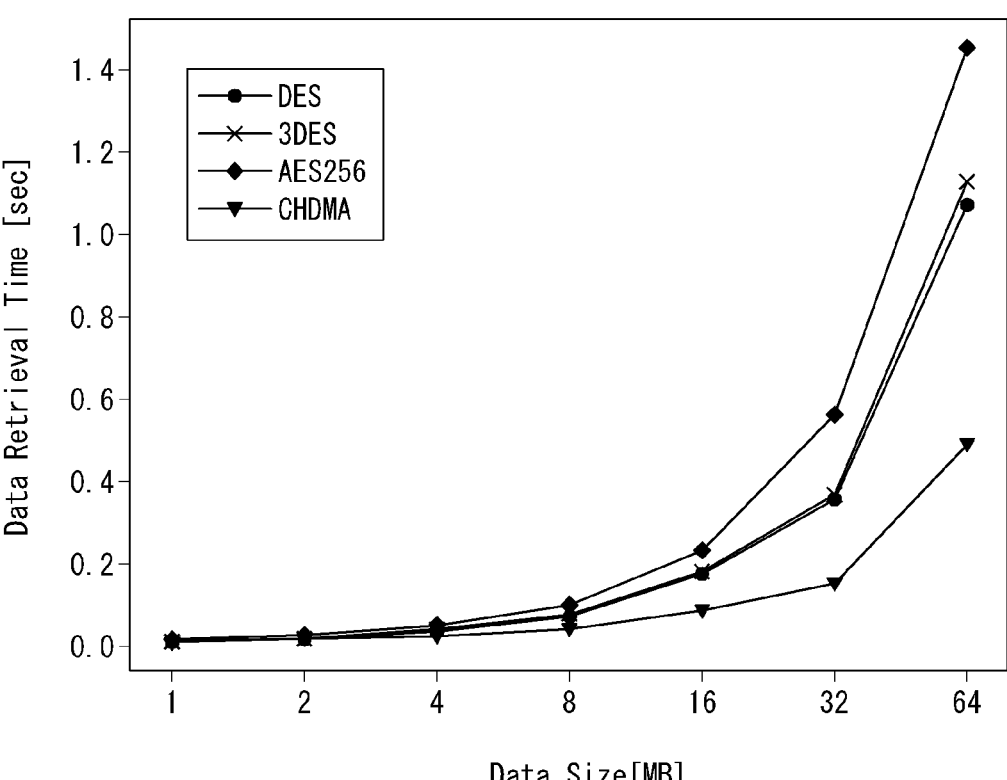
(b) Data retrieval time vs. Data size.

【FIG. 10】
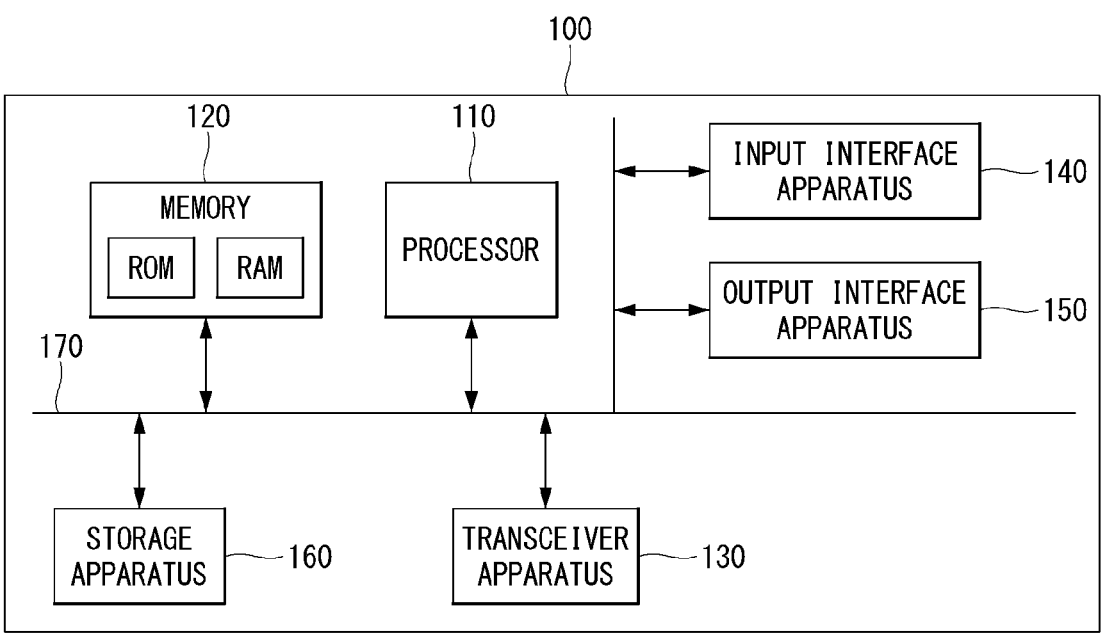

HEALTHCARE DATA MANAGEMENT METHOD AND APPARATUS USING HASH VALUES ON CLOUD SERVER

CROSS-REFERENCE TO RELATED APPLICATIONS

This application claims the benefit under 35 USC 119 (a) of Korean Patent Application No. 10-2021-0166759 filed on Nov. 29, 2021, in the Korean Intellectual Property Office, the entire disclosure of which is incorporated herein by reference for all purposes.

BACKGROUND OF INVENTION

Field of the Invention

The present disclosure relates to a healthcare data management method and apparatus based on a cloud server, and more particularly, to a healthcare data management method and apparatus based on a cloud server utilizing anonymity.

Related Art

As interest in healthcare increases, various healthcare services have appeared, but the services do not fulfill requirements such as security, reliability, and openness, which are requirements of a medical information system.

In particular, in an existing healthcare data management method, data is centrally stored and managed at one place, and confidentiality is protected through data encryption.

However, in recent years, such simple encrypted storage is not secure as performance of computers such as quantum computers is rapidly improved, and a centralized data management scheme has a problem in that all pieces of data leak at the time of data leakage.

SUMMARY

An object of the present disclosure is to provide a healthcare data management method and apparatus based on a cloud server for separately storing personal information and healthcare data information included in healthcare data.

A healthcare data management method according to an embodiment of the present disclosure may include receiving healthcare data including personal information and healthcare information: storing the personal information and the healthcare information: generating a first personal information hash value corresponding to the personal information: generating a first key hash value corresponding to the personal information hash value; generating a first healthcare hash value on the basis of the first personal information hash value and the first key hash value; and confirming whether the first healthcare hash value is a pre-stored value.

A healthcare data management method according to an embodiment of the present disclosure may include receiving healthcare data including personal information and healthcare information; confirming whether the healthcare data is already stored healthcare data of a user on the basis of the personal information: confirming a personal information hash value corresponding to the personal information when the healthcare data is the already stored healthcare data of the user: confirming a key hash value corresponding to the personal information hash value: confirming a healthcare hash value corresponding to the key hash value; and storing the healthcare hash value and the healthcare information.

A healthcare data management apparatus according to an embodiment of the present disclosure may include a personal information database including personal information and a personal information hash value corresponding to the personal information; a key database including the personal information hash value and a key hash value corresponding to the personal information hash value; and a healthcare database including healthcare information, and a healthcare hash value generated on the basis of the personal information hash value and the key hash value.

According to the present disclosure, it is possible to guarantee anonymity of the healthcare data by separately storing the personal information and the healthcare information.

BRIEF DESCRIPTION OF THE DRAWINGS

The accompanying drawings included for better understanding of the present disclosure, included in the present application, and constituting a part thereof illustrate embodiments of the present disclosure together with the detailed description of the principles of the present disclosure.

FIG. 1 is a block diagram of a healthcare data management system according to an embodiment of the present disclosure.

FIG. 2 is a conceptual diagram of a healthcare data management apparatus according to an embodiment of the present disclosure.

FIG. 3 is a flowchart of a method of storing healthcare data according to an embodiment of the present disclosure.

FIG. 4 is a flowchart of a method of newly storing healthcare data according to an embodiment of the present disclosure.

FIG. 5 is a flowchart of a method for retrieving the healthcare data according to an embodiment of the present disclosure.

FIGS. 6 and 7 are graphs showing performance of the data storage apparatus according to the number of key databases.

FIGS. 8 and 9 are graphs showing performance of the data storage apparatus according to a size of data.

FIG. 10 is a block diagram of a communication node according to an embodiment of the present disclosure.

DESCRIPTION OF EXEMPLARY EMBODIMENTS

Preferred embodiments of the present disclosure will be described in detail and are illustrated in the accompanying drawings. The following detailed description with reference to the accompanying drawings is intended to describe preferred embodiments of the present disclosure rather than to illustrate only embodiments that can be implemented according to the embodiments of the present disclosure. The following detailed description includes details in order to provide a thorough understanding of the present disclosure, but the present disclosure does not require all of such details. In the present disclosure, the embodiments to be described below do not have to be used separately. A plurality of or all embodiments may be used together, and specific embodiments may be used in combination.

Most terms used in the present disclosure are selected from among general terms widely used in the art, but some terms are arbitrarily selected by the applicant and meanings thereof are described in detail in the following description, as necessary. Therefore, the present disclosure should be understood on the basis of intended meanings of the terms rather than simple names or meanings of the terms.

It is apparent to those skilled in the art that the present disclosure may be embodied in other specific forms without departing from the essential characteristics of the present disclosure. Therefore, the detailed description should not be construed as restrictive in all respects, but should be considered as illustrative. The scope of the present disclosure should be determined by a reasonable interpretation of the appended claims, and all modifications within the equivalent scope of the present disclosure are included in the scope of the present disclosure.

FIG. 1 is a block diagram of a healthcare data management system according to an embodiment of the present disclosure.

Referring to FIG. 1, a healthcare data management system 1 according to the embodiment of the present disclosure may include a healthcare data collection apparatus 10, a healthcare data management apparatus 20, and a healthcare data retrieval apparatus 30.

The healthcare data collection apparatus 10 may collect healthcare data of users. For example, the healthcare data includes personal information such as a name, sex, and birthday of a user, and healthcare information such as a disease name, a heart rate (BPM), a body temperature, and a timestamp. The healthcare data collection apparatus 10 may transmit the healthcare data to the healthcare data management apparatus 20.

The healthcare data management apparatus 20 may receive the healthcare data from the healthcare data collection apparatus 10. The healthcare data management apparatus 20 may refer to cloud servers including software for distributing and storing the healthcare data. The healthcare data management apparatus 20 may distribute and store the healthcare data as the personal information and the healthcare information.

The healthcare data retrieval apparatus 30 may retrieve the healthcare data from the healthcare data management apparatus 20. The healthcare data retrieval apparatus 30 may retrieve the healthcare data distributed and stored as the personal information and the healthcare information from the healthcare data management apparatus 20. The healthcare data retrieval apparatus 30 may include personal information of the user, and may retrieve healthcare information of the user on the basis of the personal information of the user. Further, the healthcare data retrieval apparatus 30 may acquire the retrieved healthcare information.

FIG. 2 is a conceptual diagram of the healthcare data management apparatus according to the embodiment of the present disclosure.

Referring to FIG. 2, the healthcare data management apparatus 20 according to the embodiment of the present disclosure may include a personal information database 21, a plurality of key databases 23, and a healthcare database 25. For example, the number of the plurality of key databases 23 may be K, but is not limited thereto.

The personal information database 21 may receive personal information such as a name, sex, and birthday from the data collection apparatus 10. The personal information database 21 may generate a personal information hash (identity hash) value in response to the reception of the personal information. The personal information hash value may be a hash value of a randomly generated string. The personal information database 21 may store the personal information and the personal information hash value. For example, the personal information database 21 may store personal information (name: Judy, sex: Female, and birthday: 0808) and a personal information hash value Z' corresponding thereto. The personal information database 21 may transmit the personal information hash value to the plurality of key databases 23.

The plurality of key databases 23 may receive the personal information hash value from the personal information database 21. The plurality of respective key databases 23 may receive the same personal information hash value. Each of the plurality of key databases 23 may generate a key hash value corresponding to the personal information hash value. The plurality of key databases 23 may generate a key hash value in parallel. For example, when each of the plurality of key databases 23 receives the personal information hash value Z' from the personal information database 21, each of the plurality of key databases 23 may generate z1' to zK' as key hash values, and store z1' to zK' with personal information hash value Z. Further, the plurality of key databases 23 may transmit the personal information hash value and the key hash value corresponding thereto to the healthcare database 25. For example, the plurality of key databases 23 may transmit the personal information hash values Z' and the key hash values z1' to zK' to the healthcare database 25.

The healthcare database 25 may receive the healthcare information from the data collection apparatus 10. The healthcare database 25 may receive the personal information hash value and the key hash value corresponding thereto. The healthcare database 25 may generate a healthcare hash value on the basis of the personal information hash value and the key hash value corresponding thereto. The healthcare database 25 may sum all of the personal information hash values and the hash values corresponding thereto and hash a resultant sum to generate the healthcare hash value. For example, the healthcare database 25 may sum all of the personal information hash values Z and the key hash values z1' to zK' and hash a resultant sum to generate the healthcare hash value. The healthcare database 25 may store the healthcare information and the healthcare hash value. For example, the healthcare database 25 may store the healthcare information (disease name: diabetes, heart rate: 112, body temperature: 36.7, and timestamp: 2021 Jul. 23 23:00:32), and the healthcare hash value hash (Z'+z1'+z2'+z3'+zk').

FIG. 3 is a flowchart of a method of storing healthcare data according to an embodiment of the present disclosure.

Referring to FIG. 3, the healthcare data management apparatus may receive the healthcare data from the healthcare collection apparatus (S310). The healthcare data management apparatus may confirm whether the healthcare data is healthcare data of the user that has already been stored (S320). The personal information database 21 may acquire the personal information from the healthcare data. The personal information database 21 may confirm whether or not the personal information is personal information that has already been stored, and confirm the personal information hash value corresponding to the personal information. When the healthcare data is not the healthcare data of the user that has already been stored (No in S320), the healthcare data management apparatus may newly store the healthcare data (S330). A method of newly storing healthcare data may be as illustrated in FIG. 4.

FIG. 4 is a flowchart of a method of newly storing healthcare data according to an embodiment of the present disclosure.

Referring to FIG. 4, the healthcare data management apparatus may store the personal information and the healthcare information (S331). The healthcare data management apparatus 20 may receive the healthcare data from the healthcare data collection apparatus 10. The personal information database 21 may store the personal information in the healthcare data, and the healthcare database 25 may store the healthcare information in the healthcare data.

The healthcare data management apparatus may generate the personal information hash value (S332). The personal information database 21 may generate the personal information hash value on the basis of the personal information. The personal information database 21 may transmit the personal information hash value to the plurality of key databases 23.

The healthcare data management apparatus may generate the key hash value (S333). The plurality of key databases 23 may receive the personal information hash value from the personal information database 21. Each of the plurality of key databases 23 may generate the key hash value corresponding to the personal information hash value on the basis of the personal information hash value. The plurality of key databases 23 may transmit the personal information hash value and the key hash value corresponding thereto to the healthcare database 25.

The healthcare data management apparatus may generate the healthcare hash value (S334). The healthcare database 25 may receive the personal information hash value and the key hash value corresponding thereto from the plurality of key databases 23. The healthcare database 25 may sum all of the personal information hash values and the key hash values corresponding thereto, and hash a resultant sum to generate the healthcare hash value.

The healthcare data management apparatus may confirm whether or not the healthcare hash value is a pre-stored value (S335). The healthcare database 25 may confirm whether or not the healthcare hash value is a value stored in the healthcare database 25 in advance. When the healthcare hash value is the value stored in the healthcare database 25 in advance (Yes in S335), processing returns to step S332 and the personal information database 21 may generate the personal information hash value.

When the healthcare hash value is not the value stored in the healthcare database 25 in advance (No in S335), the personal information database 21 may store the personal information hash value generated in step S332, each of the plurality of key databases 23 may store the key hash value generated in step S333, and the healthcare database 25 may store the healthcare hash value generated in step S335.

Referring back to FIG. 3, when the healthcare data is the healthcare data of the user that has already been stored (Yes in S320), the healthcare data management apparatus may confirm the key hash value and the healthcare hash value (S340). The plurality of key databases 23 may confirm the key hash value corresponding to the personal information hash value confirmed in step S320. Further, the healthcare database 25 may confirm the healthcare hash value corresponding to the personal information hash value and the key hash value in step S320.

The healthcare data management apparatus may store the healthcare information (S350). The healthcare database 25 may store the healthcare information and the healthcare hash value included in the healthcare data together. The healthcare data may be the healthcare data acquired in step S310, and the healthcare hash value may be the healthcare hash value confirmed in step S340. Accordingly, healthcare information of the same user may be stored using the same healthcare hash value.

FIG. 5 is a flowchart of a method for retrieving the healthcare data according to an embodiment of the present disclosure.

Referring to FIG. 5, the healthcare data retrieval apparatus may acquire the personal information hash value (S510).

The healthcare data retrieval apparatus 30 may retrieve a personal information hash value stored in a data storage apparatus 20 on the basis of the personal information. The healthcare data retrieval apparatus 30 may acquire the personal information hash value that matches the personal information.

The healthcare data retrieval apparatus may acquire the key hash value (S520). The healthcare data retrieval apparatus 30 may acquire a key hash value stored in the data storage apparatus 20 corresponding to the personal information hash value acquired in step S510. The healthcare data retrieval apparatus 30 may retrieve the plurality of key databases 23 to acquire the key hash value corresponding to the personal information hash value from the plurality of respective key databases 23.

The healthcare data retrieval apparatus may acquire the healthcare hash value (S530). The healthcare data retrieval apparatus 30 may acquire the healthcare key hash value stored in the data storage apparatus 20 on the basis of the personal information hash value acquired in step S510 and the key hash value acquired in step S520. The healthcare data retrieval apparatus 30 may sum both the personal information hash values and the key hash values and hash a resultant sum to acquire the healthcare hash value.

The healthcare data retrieval apparatus may acquire the healthcare information (S540). The healthcare data retrieval apparatus 30 may acquire the healthcare information stored in the data storage apparatus 20 on the basis of the healthcare hash value acquired in step S530. The healthcare data retrieval apparatus 30 may retrieve the healthcare database 25 to acquire the healthcare information corresponding to the healthcare hash value. Here, the healthcare information may be plural.

FIGS. 6 and 7 are graphs showing performance of the data storage apparatus according to the number of key databases.

FIGS. 6 and 7 illustrate an average storage time and an average retrieval time according to the number of key databases with respect to each size of data, respectively. Referring to FIG. 6, it can be seen that the average storage time increases when the size of data is large, and is hardly affected by the number of key databases. Referring to FIG. 7, it can be seen that the average retrieval time increases when the size of data is large, but is hardly affected by the number of key databases.

FIGS. 8 and 9 are graphs showing performance of the data storage apparatus according to a size of data.

FIGS. 8 and 9 illustrate the average storage time and the average retrieval time according to the size of the data in existing encryption methods (DES, 3DES, and AES256) and a hashing method (CHDMA) for the data storage apparatus of the present disclosure. Referring to FIGS. 8 and 9, it can be confirmed that, when the size of the data increases, the average storage time and the average retrieval time in the hashing method for the data storage apparatus of the present disclosure are shorter than those in the existing encryption methods.

FIG. 10 is a block diagram of a communication node according to an embodiment of the present disclosure.

The communication node 100 of FIG. 10 may be one of the healthcare data collection apparatus 10, the healthcare data management apparatus 20, and the healthcare data retrieval apparatus 30.

The communication node 100 may include at least one processor 110, a memory 120, and a transceiver apparatus 130 connected to a network to perform communication. Further, the communication node 100 may further include, for example, an input interface apparatus 140, an output interface apparatus 150, and a storage apparatus 160. The respective components included in the communication node 100 may be connected by a bus 170 and communicate with each other. Here, the respective components included in the communication node 100 may be connected via an individual interface or an individual bus centered on the processor 110 instead of the common bus 170. For example, the processor 110 may be connected to at least one of the memory 120, the transceiver apparatus 130, the input interface apparatus 140, the output interface apparatus 150, and the storage apparatus 160 through a dedicated interface.

The processor 110 may execute program commands stored in at least one of the memory 120 and the storage apparatus 160. The processor 110 may mean a central processing unit (CPU), a graphics processing unit (GPU), or a dedicated processor on which the methods according to the embodiments of the present disclosure are performed. Each of the memory 120 and the storage apparatus 160 may be configured of at least one of a volatile storage medium and a non-volatile storage medium. For example, the memory 120 may be configured of at least one of a read only memory (ROM) and a random access memory (RAM).

Most terms used in the present disclosure are selected from among general terms widely used in the art, but some terms are arbitrarily selected by the applicant and meanings thereof are described in detail in the following description, as necessary. Therefore, the present disclosure should be understood on the basis of intended meanings of the terms rather than simple names or meanings of the terms.

It is apparent to those skilled in the art that the present disclosure may be embodied in other specific forms without departing from the essential characteristics of the present disclosure. Therefore, the detailed description should not be construed as restrictive in all respects, but should be considered as illustrative. The scope of the present disclosure should be determined by a reasonable interpretation of the appended claims, and all modifications within the equivalent scope of the present disclosure are included in the scope of the present disclosure.

What is claimed is:

1. A computer-implemented method for managing healthcare data, comprising:

executing, by one or more processors, operations comprising:

receiving healthcare data including personal information and healthcare information;

storing the personal information and the healthcare information separately on a cloud server;

generating a first personal information hash value based on the personal information;

generating a first key hash value based on the first personal information hash value;

generating a first healthcare hash value based on the first personal information hash value and the first key hash value;

storing the first healthcare hash value in association with the healthcare information; and confirming whether the first healthcare hash value matches a pre-stored value.

2. The method of claim 1, wherein the first key hash value comprises a plurality of values.

3. The method of to claim 1, wherein the generating of the first healthcare hash value includes:

summing the first personal information hash value and the first key hash value; and

hashing the sum of the first personal information hash value and the first key hash value.

4. The method of claim 1, wherein the confirming of whether the first healthcare hash value is-matches the pre-stored value includes:

generating a second personal information hash value corresponding to the personal information when the first healthcare hash value matches the pre-stored value.

5. The method of claim 1, wherein the confirming of whether the first healthcare hash value matches the pre-stored value includes:

storing the first personal information hash value, the first key hash value, and the first healthcare hash value when the first healthcare hash value does not match the pre-stored value.

6. The method of claim 1, wherein the implementing by the one or more processors further comprises retrieving the separately stored personal information and healthcare information.

7. A healthcare data management method comprising:

implementing, by one or more processors, the steps of:

receiving healthcare data of a user, the healthcare data including personal information and healthcare information;

confirming whether the healthcare data corresponds to already stored healthcare data of the user based on the personal information;

confirming a personal information hash value corresponding to the personal information when the healthcare data corresponds to the already stored healthcare data;

confirming a key hash value corresponding to the personal information hash value;

confirming a healthcare hash value corresponding to the key hash value; and storing the healthcare hash value and the healthcare information on a cloud server, separately from the personal information of the user.

8. The method of claim 7, wherein the key hash value comprises a plurality of values.

9. The method of claim 7, wherein the healthcare hash value is generated based on the personal information hash value and the key hash value.

10. The method of claim 7, wherein the implementing by the one or more processors further comprises retrieving the separately stored personal information and healthcare information.

11. A healthcare data management apparatus comprising:

a personal information database configured to store personal information and a personal information hash value corresponding to the personal information on a cloud server;

a key database configured to store the personal information hash value and a key hash value corresponding to the personal information hash value; and a healthcare database configured to store healthcare information, and a healthcare hash value, the healthcare hash value being generated based on the personal information hash value and the key hash value, and stored separately from the personal information database.

12. The apparatus of claim 11, wherein the healthcare hash value is generated by summing the personal information hash value and the key hash value, and hashing the sum of the personal information hash value and the key hash value.

\* \* \* \* \*